US011475202B1

(12) United States Patent
Kuo et al.

(10) Patent No.: US 11,475,202 B1
(45) Date of Patent: Oct. 18, 2022

(54) METHOD OF DESIGNING A SEMICONDUCTOR DEVICE

(71) Applicant: United Microelectronics Corp., Hsinchu (TW)

(72) Inventors: Ming-Hsien Kuo, Tainan (TW); Chih-Wei Hsu, Tainan (TW); Song-Yi Lin, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/323,893

(22) Filed: May 18, 2021

(51) Int. Cl.
*G06F 30/30* (2020.01)
*G03F 1/36* (2012.01)
*G03F 7/20* (2006.01)
*G06F 30/398* (2020.01)
*G06F 30/392* (2020.01)
*G06F 119/18* (2020.01)

(52) U.S. Cl.
CPC .............. *G06F 30/398* (2020.01); *G03F 1/36* (2013.01); *G03F 7/70441* (2013.01); *G06F 30/392* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 6,425,117 B1 | 7/2002 | Pasch et al. | |
| 7,673,278 B2* | 3/2010 | Rathsack | H01L 22/20 716/56 |
| 7,958,463 B2* | 6/2011 | Ikeuchi | G06F 30/398 430/30 |
| 8,219,941 B2* | 7/2012 | Sinha | G03F 1/36 716/51 |
| 8,434,030 B1* | 4/2013 | Hou | G06F 30/398 716/54 |
| 10,997,340 B2* | 5/2021 | Hu | G03F 7/70441 |
| 2015/0356232 A1* | 12/2015 | Bornholt | G06F 30/394 716/52 |

FOREIGN PATENT DOCUMENTS

| | | | | |
|---|---|---|---|---|
| CN | 103645611 B | * | 11/2015 | ............ G03F 7/20 |
| CN | 108009316 A | * | 5/2018 | ............ G03F 1/36 |

* cited by examiner

*Primary Examiner* — Leigh M Garbowski
(74) *Attorney, Agent, or Firm* — J.C. Patents

(57) ABSTRACT

A method of designing a semiconductor device includes creating a library for test patterns on a frame and an on purpose violation layout on a main chip of a layout, and then creating filter marks according to the library. An OPC (optical proximity correction) is run using the layout, and an OPC verifying is performed for obtaining a pattern with hot spots to determine whether the hot spots are within the frame and the filter marks. When the hot spots are within the frame and the filter marks, a mask can be made. When the hot spots are outside the frame and the filter marks, it is necessary to check whether the hot spots need to be repaired. When the hot spots are within the frame and outside the filter marks, the hot spots are added into the library as data of the on purpose violation layout.

9 Claims, 2 Drawing Sheets

METHOD OF DESIGNING A SEMICONDUCTOR DEVICE

BACKGROUND

Technical Field

The disclosure relates to a semiconductor manufacturing technique, and more particularly, to a method of designing a semiconductor device.

Description of Related Art

To design a semiconductor device, a lot of layouts are drawn by the designer. Those layouts would be subjected to various tests such as DRC (design rule checking) check for checking whether the layouts meet the design rule, and then an OPC (optical proximity correction) would be run to correct the masks for reproducing the layouts.

However, those tests as well as OPC took a lot of time for checking the layout and the hot spots. Once the layouts are updated, those tests and OPC would be performed again. Accordingly, both the OPC cycle time and human loading are significantly increased.

SUMMARY

The disclosure provides a method of designing a semiconductor device to save the analysis time by the library to filter many hot spots that no need to be checked, especially in OPC (optical proximity correction) verifying.

The method of designing a semiconductor device of one embodiment of the disclosure includes creating a library for test patterns on a frame of a layout and an on purpose violation layout on a main chip of the layout, creating a plurality of filter marks according to the library, running an OPC using the layout, performing an OPC verifying for obtaining a pattern with a plurality of hot spots to determine whether the hot spots are within the frame and the filter marks, making a mask when the hot spots are within the frame and the filter marks, checking whether the hot spots need to be repaired when the hot spots are outside the frame and the filter marks, and adding the hot spots into the library as data of the test patterns when the hot spots are within the frame and outside the filter marks.

In an embodiment of the disclosure, the method of creating the filter marks comprises pattern-matching.

In an embodiment of the disclosure, after creating the library, the method further comprises storing the library in a data base containing the frame and the main chip.

In an embodiment of the disclosure, after the step of checking whether the hot spots need to be repaired, the method further comprises repairing the OPC when the hot spots need to be repaired, and performing the OPC verifying again.

In an embodiment of the disclosure, after the step of checking whether the hot spots need to be repaired, the method further comprises making the mask when the hot spots do not need to be repaired.

In an embodiment of the disclosure, before running the OPC, the method further comprises performing a DRC (design rule checking) check for determining whether the layout except for the filter marks violates design rules, and analyzing the violated layout when the layout except for the filter marks violates the design rules.

In an embodiment of the disclosure, the step of performing the DRC check comprises producing a report of design rule violations, and excluding the design rule violations on the filter marks from the report.

In an embodiment of the disclosure, after analyzing the violated layout, the method further comprises adding into the library as data of the on purpose violation layout when the violated layout is on purpose.

In an embodiment of the disclosure, after analyzing the violated layout, the method further comprises correcting the layout when the violated layout is not on purpose.

In an embodiment of the disclosure, after correcting the layout, the method further comprises storing the corrected layout in a data base containing the frame and the main chip.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
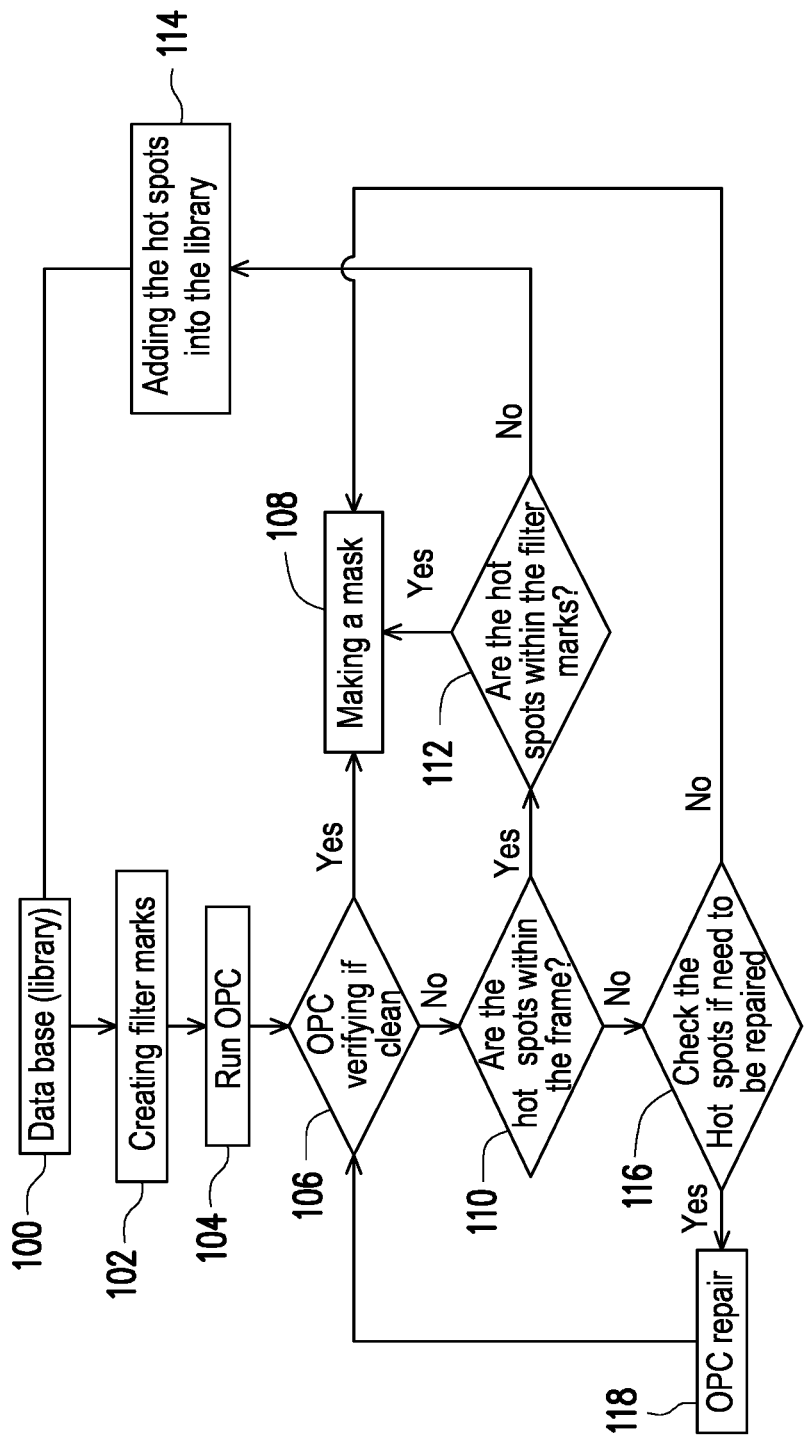
FIG. 1 is a flow chart of a method of designing a semiconductor device according to an embodiment of the disclosure.

Reference will now be made in detail to the present exemplary embodiments of the invention, examples of which are illustrated in the accompanying drawings. Wherever possible, the same reference numbers are used in the drawings and the description to refer to the same or like steps.

The disclosure relates to a method of designing a semiconductor device. According to the method of designing a semiconductor device, the checking numbers of hot spots are significantly reduced by filter marks, thereby reducing OPC (optical proximity correction) cycle time and human loading significantly.

The following describes the invention by using some embodiments. However, the invention is not limited to the listed plurality of embodiments, and the plurality of embodiments may be combined appropriately.

FIG. 1 is a flow chart of a method of designing a semiconductor device according to an embodiment of the disclosure. Referring to FIG. 1, for designing a semiconductor device, a layout is first designed, and the layout includes at least a frame and a main chip. A library for test patterns on the frame and an on purpose violation layout on the main chip are created. The library may be obtained from a test kay database about the layout and stored in a data base containing the frame and the main chip (step 100).

In the step 102, a plurality of filter marks is created according to the library, wherein the method of creating the filter marks is, for example, pattern-matching. The pattern-matching is used to apply in design rule checking (DRC), SRAM IP checking, reliability checking, and failure analysis. In the disclosure, the pattern-matching can be used for creating the filter marks. For example, there are 1,000 test patterns in a layout, and the test patterns in predetermined area are included in one filter mark by the pattern-matching, and then the 1,000 test patterns may be converted into several filter marks.

In the step 104, an OPC is run using the layout, and then performing an OPC verifying for obtaining a pattern with a plurality of hot spots (step 106) to determine whether the hot spots are within the frame and whether the hot spots are within the filter marks.

If there are ignorable or no hot spots, it means that the OPC verifying is clean, and a mask can be made according the layout (step 108).

If the OPC verifying is not clean, the method may proceed to the step 110. That is, the hot spots are discovered in the step 106, a step of checking whether the hot spots are within the frame is performed (step 110).

If the hot spots are within the frame, the method may proceed to the step 112. By contrast, if the hot spots are not within the frame, the method may proceed to the step 116. Since the hot spots within the frame are mostly not influence the layout, it has no need to spend a lot of time for analyzing.

In the step 112, a step of checking whether the hot spots are within the filter marks is performed. If the hot spots are within the filter marks, the method may proceed to the step 108. By contrast, if the hot spots are not within the filter marks, the method may proceed to the step 114.

Once the hot spots are within the frame and the filter marks, it has no need to spend time analyzing the layout, and a mask can be made according the layout (step 108).

On the contrast, if the hot spots are within the frame and outside the filter marks, it means that the hot spots are corresponding to some test patterns or on purpose violation layout, and thus these hot spots should be added into the library as data of the test patterns (step 114).

If the hot spots are outside the frame and the filter marks, a step for checking whether the hot spots need to be repaired is done (step 116). Since most hot spots within the frame and the filter marks are excluded, the time for analyzing the layout can be saved.

If the hot spots need to be repaired, the method may proceed to the step 118. By contrast, if the hot spots do not need to be repaired, the method may proceed to the step 108 for making a mask according the layout.

In the step 118, the OPC is repaired when the hot spots need to be repaired, and then the step 106 of OPC verifying is performed again.

According to this embodiment, because of creating the filter mark containing the test patterns on the frame and the on purpose violation layout on the main chip, the checking numbers of hot spot can be significantly reduced, and mask quality can be also improved.

Figure 2:
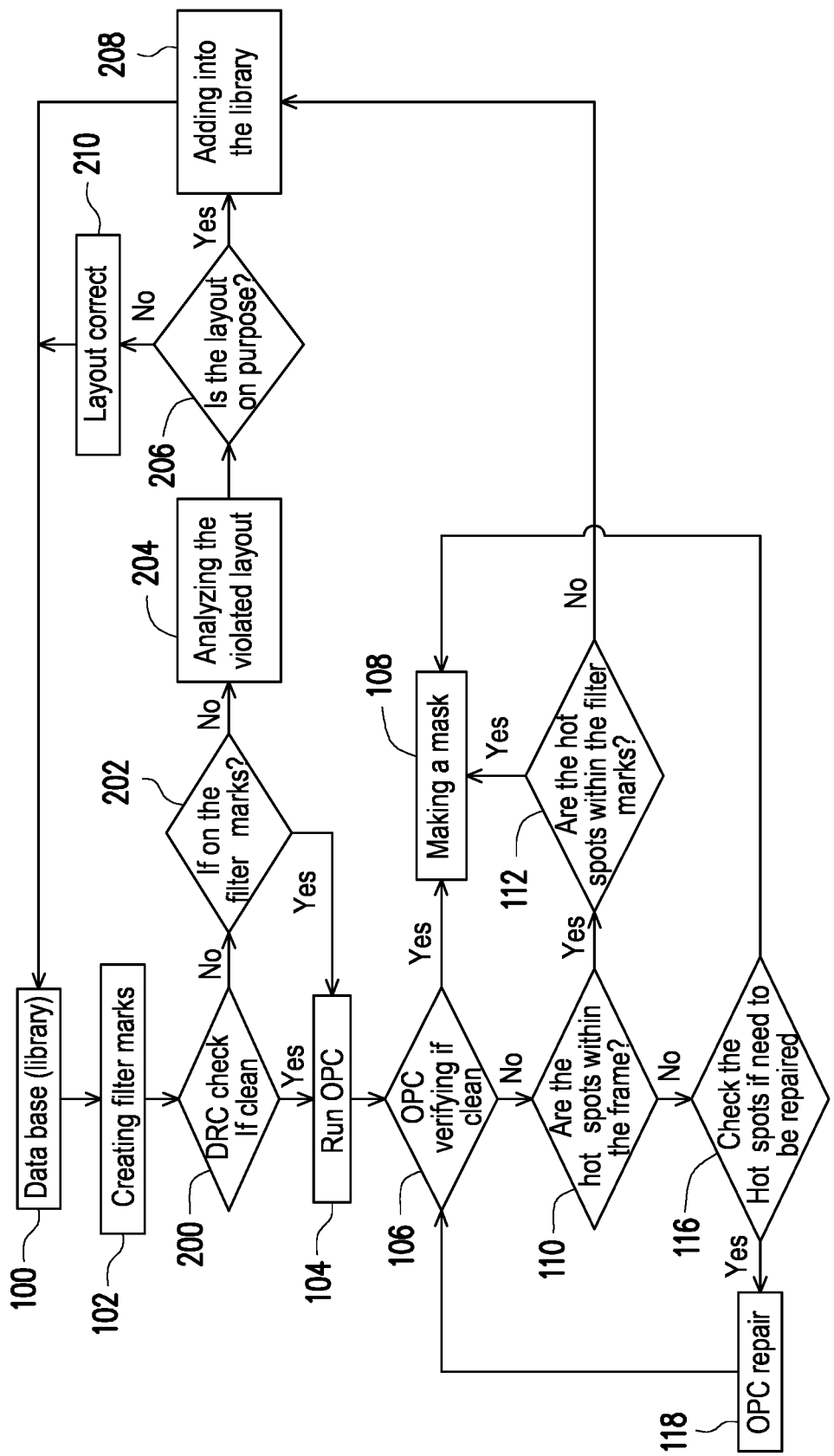
FIG. 2 is a flow chart of a method of designing a semiconductor device according to another embodiment of the disclosure.

FIG. 2 is a flow chart of a method of designing a semiconductor device according to another embodiment of the disclosure, wherein the reference symbols used in above embodiment are used to equally represent the same or similar steps. The description of the same steps can be derived from above embodiment, and will not be repeated here.

Referring to FIG. 2, the steps 100, 102, 104, 106, 108, 110, 112, 116 and 118 are the same as those in above embodiment, and the difference between this embodiment and above embodiment is before the step 104, a DRC (design rule checking) check is performed for determining whether or not the layout except for the filter marks violates design rules.

For example, in the step 200, the DRC check is run to check if it is clean or not. The DRC check can produce a report of design rule violations, and if there are no design rule violations, it means that the DRC check is clean, and then the step 104 can be performed.

However, if the report shows the design rule violations, the step 202 is proceed to exclude those design rule violations on the filter marks. In other words, if the design rule violations are corresponding to the filter marks, it has no need to spend a lot of time analyzing the violated layout, and the method may proceed to the step 104. On the contrary, if the design rule violations are not on the filter marks, it means that the layout except for the filter marks violates the design rules, and the method may proceed to the step 204.

In the step 204, the violated layout is analyzed, and the analyzing is complex and tedious time-consuming work. Since most design rule violations within the filter marks are excluded, the time for analyzing the violated layout can be greatly saved.

After the step 204, if the violated layout is on purpose (step 206), the method may proceed to the step 208; by contrast, if the violated layout is not on purpose (step 206), the method may proceed to the step 210.

In the step 208, the violated layout is added into the library as data of the on purpose violation layout. The step 208 is similar to the step 114 in above embodiment, and both of these steps are to add information found later to the library.

In the step 210, the violated layout should be corrected. After the step 210, the corrected layout would be stored in the data base and proceeding the foregoing steps until a mask is made (step 108).

In this embodiment, because of creating the filter mark, the checking numbers of hot spot can be significantly reduced, and the process of the DRC check also can exclude a lot of design rule violations so as to save the OPC cycle time indirectly.

In summary, the method of designing a semiconductor device according to the disclosure creates a library for both the test patterns on the frame of the layout and the on purpose violation layout on the main chip of the layout, and therefore a lot of the OPC hot spots can be filtered, so that the OPC cycle time and human loading can be significantly reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of designing a semiconductor device, wherein a layout for the semiconductor device includes at least a frame and a main chip, and the layout comprises a violation layout, the method comprising:
   creating a library for test patterns on the frame and the violation layout on the main chip, wherein the violation layout is on purpose;
   creating a plurality of filter marks on the layout according to the library, wherein the step of creating the filter marks is pattern-matching to apply in a design rule checking (DRC), a SRAM IP checking, a reliability checking, and a failure analysis;
   running an OPC (optical proximity correction) using the layout;
   performing an OPC verifying for obtaining a pattern with a plurality of hot spots to determine whether the hot spots are within the frame and the filter marks;

making a mask when the hot spots are within the frame and the filter marks;

checking whether the hot spots need to be repaired when the hot spots are outside the frame and the filter marks; and adding the hot spots into the library as the test patterns when the hot spots are within the frame and outside the filter marks.

2. The method of claim 1, wherein after creating the library, further comprising storing the library in a data base containing the frame and the main chip.

3. The method of claim 1, wherein after the step of checking whether the hot spots need to be repaired, further comprising:

repairing the OPC when the hot spots need to be repaired; and performing the OPC verifying again.

4. The method of claim 1, wherein after the step of checking whether the hot spots need to be repaired, further comprising making the mask when the hot spots do not need to be repaired.

5. The method of claim 1, wherein before running the OPC, further comprising:

performing a DRC (design rule checking) check for determining whether the layout except for the filter marks violates design rules; and analyzing the layout except for the filter marks when the layout except for the filter marks violates the design rules.

6. The method of claim 5, wherein the step of performing the DRC check comprising:

producing a report of design rule violations; and excluding the design rule violations on the filter marks from the report.

7. The method of claim 5, wherein after analyzing the layout except for the filter marks, further comprising adding the layout except for the filter marks into the library when the violated layout except for the filter marks is on purpose.

8. The method of claim 5, wherein after analyzing the layout except for the filter marks, further comprising correcting the layout when the layout except for the filter marks is not on purpose.

9. The method of claim 8, wherein after correcting the layout, further comprising storing the corrected layout in a data base containing the frame and the main chip.

\* \* \* \* \*